US008491121B2

(12) United States Patent
Tilleman et al.

(10) Patent No.: US 8,491,121 B2
(45) Date of Patent: Jul. 23, 2013

(54) PUPIL SCAN APPARATUS

(75) Inventors: Michael M. Tilleman, Arlington, MA (US); Jonathan Everett, Arlington, MA (US); Richard Wolfe, Londonderry, NH (US)

(73) Assignee: Elbit Systems of America, LLC, Fort Worth, TX (US)

( * ) Notice: Subject to any disclaimer, the term of this patent is extended or adjusted under 35 U.S.C. 154(b) by 1032 days.

(21) Appl. No.: 12/287,264

(22) Filed: Oct. 7, 2008

(65) Prior Publication Data

US 2009/0128901 A1 May 21, 2009

Related U.S. Application Data

(60) Provisional application No. 60/998,143, filed on Oct. 9, 2007.

(51) Int. Cl.
*A61B 3/14* (2006.01)

(52) U.S. Cl.
USPC ............................. 351/208; 351/205; 351/246

(58) Field of Classification Search
USPC .................................. 351/200, 205, 208, 246
See application file for complete search history.

(56) References Cited

U.S. PATENT DOCUMENTS

| | | | |
|---|---|---|---|
| 4,502,751 A | 3/1985 | Fjeldsted et al. | |
| 5,777,720 A | 7/1998 | Shapiro et al. | ................ 351/237 |
| 5,805,119 A | 9/1998 | Erskine et al. | |
| 5,978,128 A | 11/1999 | Yoon | |
| 6,008,484 A | 12/1999 | Woodgate et al. | ......... 250/201.1 |
| 6,874,894 B2 | 4/2005 | Kitamura | |
| 7,271,960 B2 | 9/2007 | Stewart et al. | |
| 7,377,652 B2 | 5/2008 | Whitehead et al. | |
| 7,405,856 B2 | 7/2008 | Doherty et al. | |
| 7,413,309 B2 | 8/2008 | Whitehead et al. | |
| 2002/0036750 A1* | 3/2002 | Eberl et al. | ..................... 351/207 |
| 2002/0186348 A1* | 12/2002 | Covannon et al. | ............. 351/240 |

(Continued)

FOREIGN PATENT DOCUMENTS

| | | |
|---|---|---|
| WO | 92/03187 A1 | 3/1992 |
| WO | WO 2005/122596 | 12/2005 |

OTHER PUBLICATIONS

Extended European Search Report issued by the European Patent Office for Application No./ Patent No. 08837631.4-1234/2212735 PCT/US2008011569; Reference: J52683EP/PLC, Feb. 20, 2012.

(Continued)

*Primary Examiner* — James Greece
(74) *Attorney, Agent, or Firm* — Conley Rose, P.C.

(57) ABSTRACT

An apparatus and method by which an image is projected to pupils of a viewer. Preferably, the image covers only areas occupied by the pupils and tracks the areas occupied by the pupils such as to provide continuous display of the imagery to a viewer. The method is to dynamically control the direction of light into sub-apertures selected by a tracking device. By imaging selectively into the sub-apertures where the pupils are temporally located instead of imaging into a generally large area, the disclosed apparatus is power efficient and exclusive because the projected images are covert. This method is applicable to most biocular displays, for instance, but not limited to "see through" systems, which overlay imagery over real world scenes and where geometrically precise projection is critical. In one embodiment, the pupil scan apparatus is combined with a retinal scan apparatus to provide security. In this manner, only an authorized user of the apparatus can operate it.

18 Claims, 12 Drawing Sheets

U.S. PATENT DOCUMENTS

2003/0156260 A1* 8/2003 Putilin et al. .................... 353/10
2006/0028400 A1* 2/2006 Lapstun et al. ................... 345/8
2006/0139711 A1* 6/2006 Leister et al. .................... 359/9
2006/0209310 A1  9/2006 Muenz et al.
2006/0344918    11/2006 Cossairt et al.

OTHER PUBLICATIONS

Examination Report issued by the European Patent Office on Jan. 2, 2013 in European Patent Application No. 08 837 631.4-1234.

* cited by examiner (A)

(B)

(C)

PUPIL SCAN APPARATUS

This application claims benefit of U.S. Provisional Application Ser. No. 60/998,143, filed Oct. 9, 2007, pursuant to 35 USC §119(e).

FIELD OF INVENTION

A pupil scanning apparatus to dynamically project images into selected sub-apertures of a biocular display optical system.

BACKGROUND OF THE INVENTION

The design of biocular optics for projected displays must take into account a variety of factors to display the image as desired. It must be color corrected for the desired wavelengths, must maintain imaging and brightness performance over its entire eye motion box (EMB), and when both eyes are in the exit aperture, it must have the specified level of parallax between the left and right eye images.

Biocular displays are typically designed to project a single object as a stereoscopic image pair, which will appear from a defined apparent distance. When the angles of incidence at the observer's eyes are parallel between the left and right eyes, the image will appear to come from infinity. If the azimuth angle between the left and right eye views of object points varies over the image, the object scene will appear to be on a surface with a specific shape. Because the eyes are separated in the horizontal plane, there is no real interpretation to an elevation angular difference between the left and right eye views. Similarly there are no real objects that require the left and right eyes to diverge (point outwards) in order to view stereoscopically, as such object would (via parallax) appear to be located 'beyond' infinity. In both cases such a projection will result in double images (failure to achieve stereopsis), eyestrain, and/or discomfort.

A further issue results when the apparent location of viewed image points moves as the eyes move laterally in the EMB, meaning that the angle of projection of an object point varies as a function of lateral eye position. In such cases when this aberration is excessive and because an observer's head and eyes are in constant motion, the image is often interpreted as grossly distorted, disorienting, and 'swimming'.

As shown in FIG. 4, this situation is well known in the art. As illustrated, a rightward translation of the eyes would cause the apparent location of the images to also shift to the right. Because this is in the opposite direction to the visual effect experienced when viewing stationary objects directly, the image would appear to be rapidly moving.

All of these negative issues result from parallax errors, an uncorrected difference in the intended angle of light rays from the same object point when projected into different locations in the system exit optical aperture. For large aperture optics (and therefore low F/Number), correction over the whole aperture presents a challenge.

Correction of ray angles for all possible aperture positions typically requires an increased number of lenses or other optical design degrees of freedom such as the uses of aspheric or diffractive surfaces. These measures add cost, complexity, and also tend to increase the physical size as more lenses take up more room. The requirement for precise parallax correction also limits the ability to implement other potentially desirable attributes such as higher resolution, multicolor projection, and wider fields of view.

Human eye pupils have a diameter varying between 4 and 7 mm, depending on the magnitude of background light, direct illumination and psychological-physiological effects. Artificial imagery created by viewing devices and projectors is usually projected to large apertures covering sufficient area where eyes of viewers may be located. The typical imaging aperture may occupy an area of 50 $cm^2$, a factor over fifty relative to a pair of the broadest pupils. Therefore, savings by a similar factor of the projection luminance may be rendered once the image is projected only into sub-apertures coinciding with the pupils. Such luminance saving induces electric power saving which is particularly beneficial in portable, airborne and spaceborne applications. Furthermore, projection of an image to a large aperture permits viewing by all incident viewers, whereas projection to the sub-apertures is exclusive to a particular viewer.

The design of biocular optics for projected displays must be color corrected for the desired wavelengths, must maintain imaging and brightness performance over its entire eye motion box (EMB), and when both eyes are in the exit aperture, it must have the specified level of parallax between the left and right eye images. In addition the apparatus must be designed as a telecentric system stemming from the fact that the viewer eyes are directed at a known target, for instance a screen or a combiner. Then it also possesses the advantage wherein third order aberrations such as coma and astigmatism can be canceled. With respect to parallax, rays of parallel angle of incidence at the observer's left and right eyes appear to come from infinity, whereas azimuth angle between the left and right eye makes the image reside on a surface with a specific shape. When the apparent location of viewed image points moves as the eyes move laterally in the angle of projection of an object point varies as a function of lateral eye position. If the optical aberration is excessive and because an observer's head and eyes are in constant motion, the image in this case becomes grossly distorted. The uncorrected difference in the intended angle of light rays emanating from the same object point, when projected into different locations in the system exit aperture, result in parallax errors.

Without the need to correct for parallax, an avionic HUD optic need only be corrected over any F/12 to F/25 sub aperture, the aperture limit set by an observer's single eye as opposed to the whole. As most HUD's are monochromatic this would be relatively straightforward. Typically, a biocular HUD optic operates over and requires parallax correction for an F/0.8 to F/1.5 relative aperture, which is quite challenging. A typical specification for parallax in an avionic HUD application is less than 1.5 milliradians in the central portion of the field of view (FOV) and less than 6 milliradians in the outer portions of the FOV.

U.S. Pat. No. 6,874,894, issued to Kitamura on Apr. 5, 2005, discloses a projector equipped with a DMD (digital micro-mirror device). The projector is provided where an image is generated by an image display device receiving an image data from a personal computer or a video camera and then is projected on a screen. The projector hence includes an optical system for projection of images.

U.S. Pat. No. 5,978,128, issued to Yoon on Nov. 2, 1999 discloses a deformable mirror device (DMD) for changing a proceeding path of an incident light, and more particularly, to a deformable mirror device having an improved structure so that the path of light can be easily changed with a low driving voltage.

U.S. Pat. No. 5,805,119, issued to Erskine et al. on Sep. 8, 1998, discloses projected displays suitable for use in motor vehicles. It reflects information the vehicle operator needs off of a half mirror or the windshield and projects that information at a distance in front of the vehicle. Sometimes heads-up displays are used in automotive applications such that the image is projected up and reflected off of the vehicle front windshield to appear at a distance in front of the driver. In such cases, the front windshield is used as a combiner allowing the head-up display image to appear together with the view through the front windshield. With a heads-up display in a vehicle, the driver does not have to adjust his/her eyes from the road to read information such as vehicle speed, which is normally displayed in the vehicle instrument panel.

U.S. Pat. No. 7,271,960, issued to Stewart on Sep. 18, 2007, discloses an integrated heads-up-display (HUD) device including a housing that houses an active-matrix image projecting system and its accompanying electronics. An optical combiner is connected to the housing via a retractable arm attached at one end to the main body and holds the HUD optical panel at its other end. A telescopically retractable arm allows the assembly to extend or retract for a desirable combiner height. Further, the LED backlighting array is placed within a reflective light chamber, which is lined with a safe, lightweight, low cost, specular, reflective sheet for high reflectivity U.S. Pat. No. 7,413,309, issued to Whitehead et al. on Aug. 19, 2008, discloses a display having a screen, which incorporates a light modulator. The screen may be a front projection screen or a rear-projection screen. Elements of the light modulator may be controlled to adjust the intensity of light emanating from corresponding areas on the screen. The display may provide a high dynamic range.

U.S. Pat. No. 7,405,856 discloses display systems and the preferred embodiment relates to a display system with clock-dropping to compensate for lamp variations.

U.S. Pat. No. 7,377,652, issued to Whitehead et al. on May 27, 2008, discloses a display, which has a screen, which incorporates a light modulator. The screen may be a front projection screen or a rear-projection screen. Elements of the light modulator may be controlled to adjust the intensity of light emanating from corresponding areas on the screen. The display may provide a high dynamic range.

None of the above-referenced devices discloses or suggest, either alone or in combination with one another, the invention disclosed herein.

SUMMARY OF THE INVENTION

It is an aspect of the invention to provide a pupil scan apparatus that simplifies the main projection optic.

It is another aspect of the invention to minimize the effects of parallax.

It is an aspect of the invention to provide an ability to display binocular image pairs for stereopsis (3-D) imaging.

It is yet another aspect of the invention to provide the ability to increase illumination efficiency.

It is another aspect of the invention to improve the illumination uniformity across the eye motion box.

It is also an aspect of the invention to facilitate full color display in an otherwise monochromatically optimized optical system.

It is another aspect of the invention that it is part of a look-though biocular display system which overlays symbology and/or imagery over a real-world scene.

It is yet another aspect of the invention that is located at the object plane of the projection optic of a biocular display system.

It is another aspect of the invention that has an optical architecture in which an aerial image of an image device (e.g. LCOS or DLP) is formed near the object plane of the projection optics.

Another aspect of the invention is to monitor the location of a pupil and transmit the corresponding coordinates to the pupil scanning imager that subsequently moves the projected image to the coordinates.

It is another aspect of the invention wherein the apparatus is provided with a device identifying the viewer's retina used a permission code for viewing the image.

It is yet another aspect of the invention that has an optical means of image dividing and focusing into smaller sub-images near the aerial image of the image device which is typically accomplished by a 1D (lenticular) or 2D (lenslet) microlens array with a positive focal length It is yet another aspect of the invention to provide a second divided optic with the same orientation, with the same or near the same spatial pitch as the first, and located at or near the focal plane of the image formed by the divided first optic. The second divided optic will direct; through refraction, reflection, or diffraction; the sub-images that pass through it as a function of the relative position of the first optic to the second. The second optic would typically be a second microlens array (1D or 2D) with either a positive or negative focal length, or could be a prism array to direct into a specific sub-aperture location.

It is another aspect of the invention to provide a mechanism to displace the first optic laterally with respect to the second and which can respond at speeds that are multiples of the basic display frame rate (i.e. multiples of 25 to 60 Hz typically). The total movement distance required is up to the maximum pitch of the divided optic.

It is another aspect of the invention to provide a high frame rate image device (e.g. a DLP from Texas Instruments) that can display images at a minimum of twice the speed necessary for minimal flicker, stereopsis display.

It is still another aspect of the invention to provide a combination pupil scan apparatus with a retinal scan apparatus.

It is another aspect of the invention that it has means to compute the parallax corrected image for each displayed frame in the biocular pair as a function of the characteristics of the display projection optics, the desired parallax projection, and the location (nominal or actual) of the observer's eye pupils.

Finally, it is an aspect of the invention to provide an optional means of determining the location of the observer's pupils within the eye-box of the display to determine that actual pupil location (e.g. a pupil tracking camera).

This invention discloses an apparatus and method by which an image is projected to pupils of a viewer. Preferably, the image covers only areas occupied by the pupils and tracks the areas occupied by the pupils such as to provide continuous display of the imagery to a viewer. The method is to dynamically control the direction of light into sub-apertures selected by a tracking device. By imaging selectively into the sub-apertures where the pupils are temporally located instead of imaging into a generally large area, the disclosed apparatus is power efficient and exclusive because the projected images are covert. This method is applicable to most biocular displays, for instance, but not limited to "see through" systems, which overlay imagery over real world scenes and where geometrically precise projection is critical. In one embodiment, the pupil scan apparatus is combined with a retinal scan apparatus to provide security. In this manner, only an authorized user of the apparatus can operate it.

DETAILED DESCRIPTION OF THE INVENTION

Figure 1:
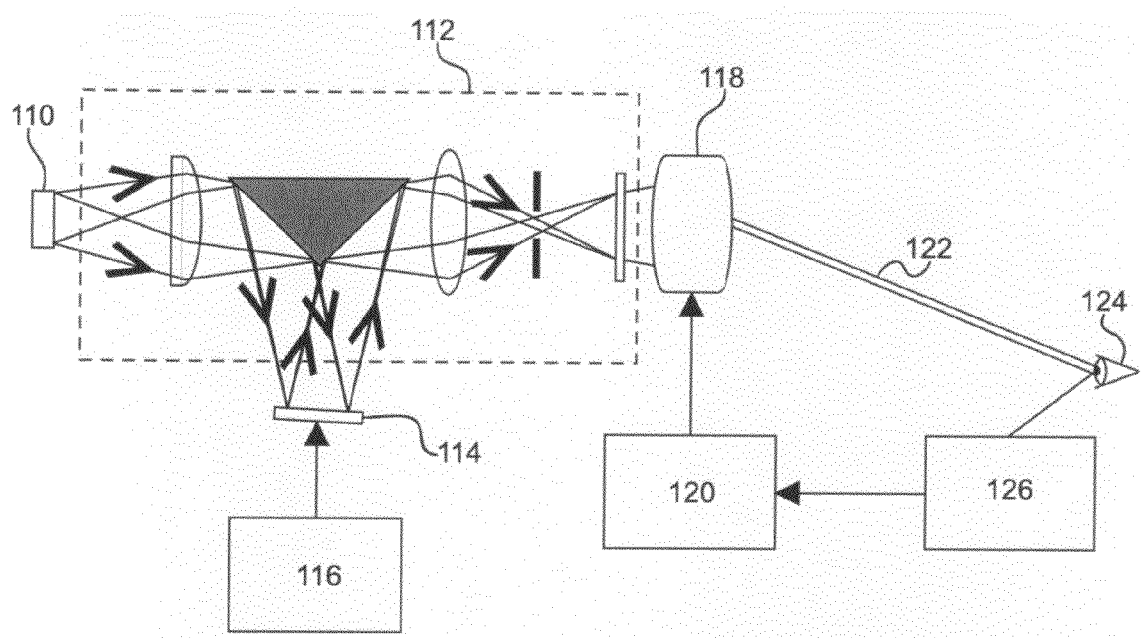
FIG. 1 is an illustration of the pupil scan apparatus showing the projection of an image to the pupil in accordance with the invention.

The invention discloses an apparatus and method by which an image is projected to pupils of an observer preferably covering only areas occupied by the pupils and tracking the areas occupied by the pupils such as to provide continuous display of the imagery to the observer. The method is to dynamically control the direction of light into sub-apertures selected by an eye tracking device. By imaging selectively into the sub-apertures where the eye pupils are temporally located instead of imaging into a generally large area the disclosed apparatus is power efficient and exclusive because the projected images are covert. This method is applicable to most biocular displays, for instance but not limited to "see through" systems, which overlay imagery over real world scenes and where geometrically precise projection is critical.

Human eye pupils have a diameter varying between 4 and 7 mm, depending on the magnitude of background light, direct illumination and psychological-physiological effects. Artificial imagery created by viewing devices and projectors is usually projected to large apertures covering sufficient area where eyes of observers may be located. The typical imaging aperture may occupy an area of 50 $cm^2$, a factor over fifty relative to a pair of the broadest pupils. Therefore, savings by a similar factor of the projection luminance may be rendered once the image is projected only into sub-apertures coinciding with the pupils. Such luminance saving induces electric power saving which is particularly beneficial in portable, airborne and spaceborne applications. Furthermore, projection of an image to a large aperture permits viewing by all incident observers, whereas projection to the sub-apertures is exclusive.

Parallax Errors

The design of biocular optics for projected displays must be color corrected for the desired wavelengths, must maintain imaging and brightness performance over its entire eye motion box (EMB), and when both eyes are in the exit aperture, it must have the specified level of parallax between the left and right eye images. In addition the apparatus must be designed as a telecentric system stemming from the fact that the observer eyes are directed at a known target, for instance a screen or a combiner. Then it also possesses the advantage wherein third order aberrations such as coma and astigmatism can be canceled. With respect to parallax, rays of parallel angle of incidence at the observer's left and right eyes appear to come from infinity, whereas azimuth angle between the left and right eye makes the image reside on a surface with a specific shape. When the apparent location of viewed image points moves as the eyes move laterally in the angle of projection of an object point varies as a function of lateral eye position. If the optical aberration is excessive and because an observer's head and eyes are in constant motion, the image in this case becomes grossly distorted. The uncorrected difference in the intended angle of light rays emanating from the same object point, when projected into different locations in the system exit aperture, result in parallax errors. Without the need to correct for parallax, an avionic HUD optic need only be corrected over any F/12 to F/25 sub aperture, the aperture limit set by an observer's single eye as opposed to the whole. As most HUD's are monochromatic this would be relatively straightforward. Typically, a biocular HUD optic operates over and requires parallax correction for an F/0.8 to F/1.5 relative aperture, which is quite challenging. A typical specification for parallax in an avionic HUD application is less than 1.5 milliradians in the central portion of the field of view (FOV) and less than 6 milliradians in the outer portions of the FOV.

Image Frame Rate

Typically observers move their eyes within a given space referred to as EMB thus altering the location of their eye pupils. An aspect of this invention is an eye pupil tracker, which monitors the location of a pupil and transmits the corresponding coordinates to the pupil scanning imager that subsequently moves the projected image to the coordinates. In an embodiment of this invention the pupil tracker is equipped with a device identifying the observer retina used as permission code for viewing the image. In general, to permit effective scanning the dynamic bandwidth of the pupil scanner must be greater than that of the human eye motion as well as that of the rate of image transmission from the retina to the brain. The pupil moves at speeds commensurate with the speed of human body, head and eyeballs. They correspond to bandwidths of no more than about 20 Hz. Then the rate of image transmission from the retina to the brain is about 30 Hz. Finally based on the art of cinematography frame rate devoid of flickering is that of at least 50/60 Hz. This determines an adequate system bandwidth of about 100 Hz. Reduced bandwidth requires increasing the sub-apertures up to a point where they become comparable with the EMB cross-section, rendering the scanning ineffective and redundant. This sets a lower limit on the system bandwidth. For instance, assuming that the scanner sub-aperture is 20% of the eyebox cross section, 50 $cm^2$, and that an eye of a human observer can move at a speed of 50 cm/s sets the lower limit of the system bandwidth at 50 Hz considering Nyquist's condition.

System Construction

The disclosed apparatus comprises an illumination source, conditioning optical elements, Spatial Light Modulator (SLM) sometimes referred to in the art as aerial image generator, optical relay and eyepiece, digital image processor and pupil tracker.

Illumination Source

For maximum efficiency, the illumination source needs to fill only the aperture required for the system. There is still a requirement that the illumination across the image be as uniform as possible. Illumination systems using condenser optics such as those found in projectors are applicable. The illumination source provides light, which once spatially amplitude-modulated carries the image. In an embodiment the light source is a Light Emitting Diode (LED), in another embodiment it is a white LED and in yet another embodiment it is a monochromatic LED. In still another embodiment the light source is a laser. In yet a further embodiment, the light source is any lamp of the incandescent, fluorescent, electric discharge in gas or any other type. The light source can be a white LED. Further, the light source can be a monochromatic LED. In yet a further embodiment the illumination source comprises a plurality of any of the formerly mentioned light sources.

Conditioning Elements

The conditioning optical elements perform a number of functions to the illuminating light: 1) beam homogenization, 2) beam direction and 3) beam-spot shaping. This renders a beam with flat intensity across the optical field with minimized light wasting at the SLM. In an embodiment where the laser serves as illuminator the conditioning optics contain a despeckling device to ensure the projection of a high resolution image without speckles. U.S. Patent Application Ser. No. 61/093,626, filed Sep. 2, 2008 by co-inventor Tilleman et al. is hereby incorporated by reference in its entirety.

Image Devices—Spatial Light Modulator (SLM)

The SLM forms an optical object generating the projected image. It is controlled by a digital image processor feeding it with data rendered as spatial modulation. In general, to permit effective optical object and video image formation the system dynamic bandwidth must be greater than that of the human eye, at least 30 frames per second. Several options for the SLM are possible. In an embodiment, the SLM is a device with pixels individually modulating the illuminating light. In another embodiment, the SLM pixels are arranged as a two-dimensional array forming a two-dimensional optical object. In yet another embodiment, the SLM is constituted by a MEMS (micro-electronic mechanical system) array, for instance Deformable Mirror Device (DMD) where micromirrors represent pixels reflecting the illumination light into specific directions whereupon said directions constitute light, dark, grey or RGB map at the image plane. In still another embodiment, the SLM is constituted by a Liquid Crystal Device (LCD) where an array of cells filled with liquid crystal material represent pixels that can be made transmissive or obstructive thus forming an object. In a further embodiment the SLM is constituted by a Liquid Crystal Optical System (LCOS).

Optical Relay

The optical relay projects an image of the object into a pupil or biocular image pair for stereopsis (three dimensional) image into two pupils. In an embodiment the relay system contains a diffuser, which serves as an intermediate image plane. In general relayed to the pupils are any number of SLM dynamic positions constituting dynamically either a single or an image pair. Then, the light rays are directed to dynamically selected sub-apertures by being steered by a set of optical elements mounted on controllable positioners and motors.

Dynamical Image Steering

In a preferred embodiment the moving optical elements comprise a set of three lenslet arrays having identical lenslet arrangement and pitch wherein the first and second arrays are stationary and the third array is mobile in the perpendicular plane, wherein the second array surface is located in the focal plane of the first array and the third array is spaced at a short distance behind it. Whereas the function of the first array is to focus the collimated beam the function of the second array is to decrease its numerical aperture and the function of the third array is to steer the resulting set of parallel beamlets. The translation of the third array by an increment $\Delta x$ is eventually translated to the image translation by $M\Delta x$ (where M is the optical magnification factor) to the desired coordinates in the image plane of the overall telecentric system. By decreasing the beamlet numerical aperture the second lenslet array relaxes both production tolerances and alignment accuracy.

In another embodiment the moving optical elements comprise a set of two lenslet arrays having identical lenslet arrangement and pitch however dissimilar focal length wherein the numerical aperture of the second array is smaller than that of the first array and wherein the first array is stationary and the second array is mobile in the perpendicular plane, wherein the second array surface is spaced at its focal length from the focal plane of the first array. Whereas the function of the first array is to focus the collimated beam the function of the second array is to steer the resulting set of parallel beamlets. The translation of the second array by an increment $\Delta x$ is eventually translated to the image translation by $M\Delta x$ to the desired coordinates in the image plane of the overall telecentric system.

Both 1D and 2D microlens arrays can be manufactured using a number of processes on a multiple of substrates. On the spectrum from most to least exotic (least expensive), a typical low cost microlens array is made via replication from a master plate in UV cure optical cement on a selected substrate. The replication masters (negatives of the final desired shape) can be made via machining or by lithography techniques, and a number of replicated surfaces can be made thereafter. The primary limitation to this process is the limitation of available indices of refraction for the molded material, which is currently limited to the indices of optical epoxies and cements. On the expensive end they can be themselves machined individually via diamond turning processes from a high index material such as zinc sulfide. In this instance any machinable material is applicable to achieve the desired form. In between are a number of other methods including injection molding into plastics. The critical concern, besides the issues implied by the example spreadsheet, is that the image formed by the lenslets be well corrected and accessible to the second array. To achieve this for the first array, the ideal form is that the substrate be low index and that the lenslets be replicated in a high index material. This allows the image formed by the array to have nearly as much back focal length as its effective focal length. Lastly, for the imaging properties of the arrays to be constant over the image and the operating environment the substrates should be sufficiently stiff.

The invention also requires a mechanism for rapid and precise positioning of the microlens arrays with respect to each other. A number of existing devices are available. One of the most compact is a piezoelectric driven flexure stage such as is available from Mad City Labs. Other means such as voice coils may also be applicable depending on the required mechanical dynamics.

In yet another embodiment, the moving optical elements comprise a Risley prism-pair individually rotateable and spaced very closely from one another. In order to image the object or relay the image to any three-dimensional coordinate these optics must be controllably set at a specific angular position attained by rotary motors that are issued location data commands by a controller being fed pupil coordinates by the pupil tracker. An imaging lens is positioned at a distance equal to its focal length approximately from the Risley prism-pair. For true telecentricity this lens comprises two lens elements spaced at a controllable length from one another. The two dimensional angular motion is provided by motors and the linear motion to one of the two image lens elements are issued data commands by a controller being fed pupil coordinates by the pupil tracker.

In still another embodiment, the moving optical elements comprise a moving lens translated in a plane perpendicular to the light rays by an X-Y translation stage. In an off-axis position the lens bends the chief ray thus projecting an image at an arbitrarily desired set of coordinates. The two dimensional linear motion is provided by actuators that are issued coordinate data commands by a controller being fed pupil coordinates by the pupil tracker.

Re-Imaging System

The re-imaging system will need to be relatively slow (F/54 at the first micro lens array in the example spreadsheet). As a general rule this allows for simplification of both the re-imaging system and the illumination system. The imaging system is nearly diffraction limited across the image, telecentric, and at a magnification of 2.6× needs only to be F/20.8 at the DLP.

Figure 11:
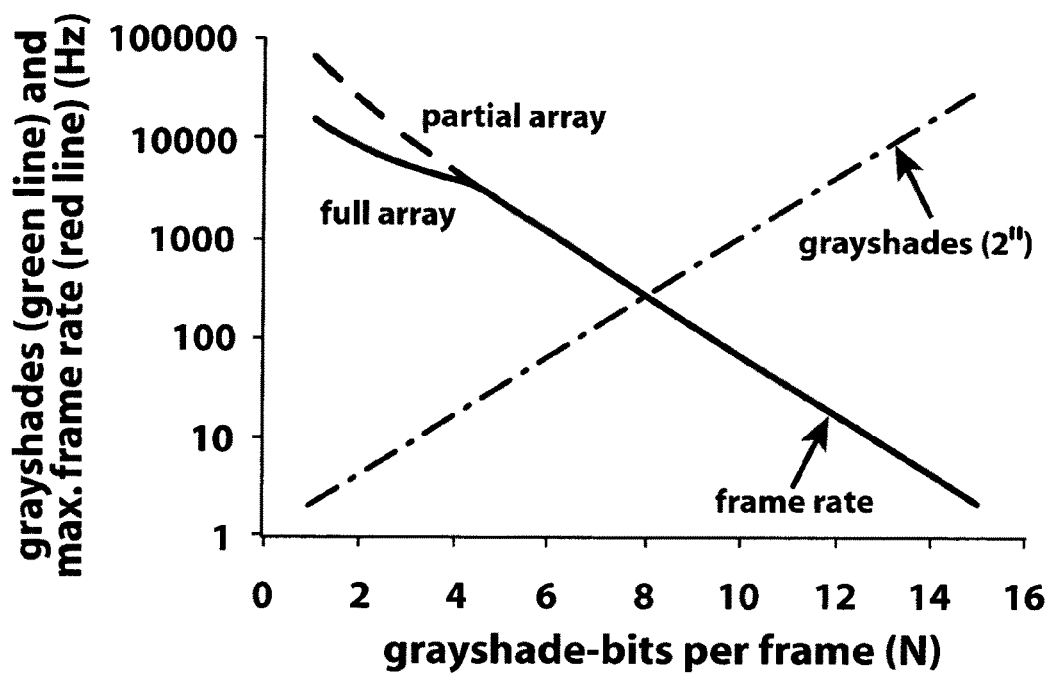
FIG. 11 is a DLP frame rate and grayshades versus grayscale bit depth
Figure 12:
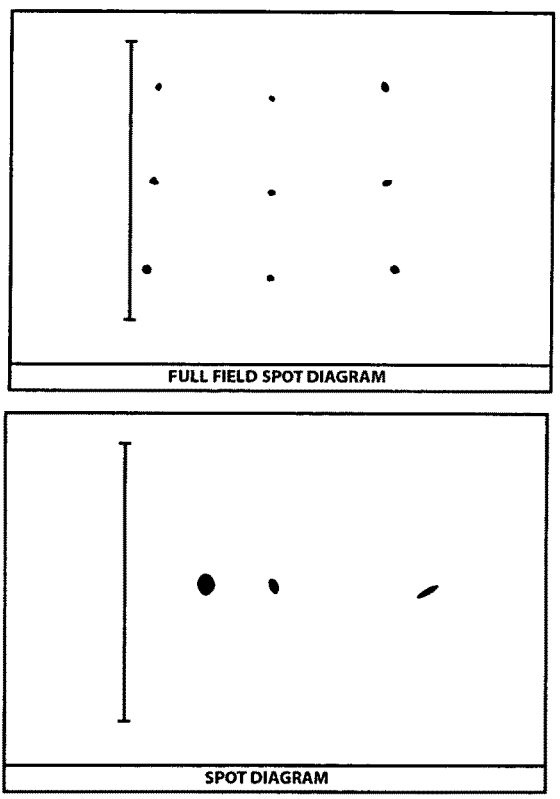
FIG. 12 is color imaging characteristics of some exemplary HUD projection optics: left—variations in parallax over the EFMB, right—lateral chromatic aberration separating the images in RGB colors.

The optical relay projects an image. The imaging device, other than meeting the optical requirements of the system, needs to have a fast enough effective frame rate to display the stereoscopic image pair in a flicker free manner. As shown in FIG. 11, bit depth versus frame rate chart for a Digital Light processing DLP unit is presented. A system stereoscopic frame rate of 30 Hz for monochromatic display requires a 60 Hz frame rate from the DLP. Per the chart below, a bit depth of 10 bits can be displayed. For a field sequential color (RGB) stereoscopic display, 6 frames are required or a 180 Hz frame rate. This leaves just under 8 bits for display in each color when using the described DLP device.

Pupil Tracking

A number of ophthalmic procedures, such as Lasik surgery, require precise location of the human eye pupil as a reference to the location of the cornea and lens. A number of high speed (>60 Hz) image based pupil tracking systems have been developed which exploit the fact that the human pupil has high contrast in the near IR.

The pupil tracker is a standard device used to track pupil location of drivers, pilots and in general personnel whose dynamic eye position is imperative to operating systems such as aircraft, automobiles, trains, military vehicles, to name a few. Some commercial eye trackers operate by emitting and dynamically recording reflected IR radiation from the eye front or back cornea surface. Their bandwidth is typically between 240 and 2000 Hz, well compatible with the pupil scanning imager required bandwidth of about 100 Hz.

For a HUD system, a small pupil tracking camera and LED based near IR illumination system can be placed on the mechanical structure above the combiner glass. From this vantage point it is straightforward to track the pupils of the observer within the EMB.

Advantages of the Invention for Full Color Display

Currently, full color HUDs in the traditional configuration for avionics applications are impractical for a number of reasons. First, adding the further constraint for color correction strains the ability to provide high performance in other areas, particularly parallax. This issue in isolation could be mitigated by pre-correcting an RGB image on the imaging device such that the projected image is color correct. Second, the brightness of 'white' light illumination sources is relatively low and/or inefficient straining the power and waste heat requirements for a HUD. The creation of 'blue' is a particular issue as the eye is less sensitive (apparent brightness per optical Watt) and there are few efficient sources of blue light (optical Watts per electrical Watt). Third, the combiner is usually constrained to have a minimum transmission for the look-through scene and must have a minimum of color shift in doing so. For a color HUD this forces either the use of a tremendously expensive, efficient 3-notch (RGB) filter coating, or requires that the illumination system be sufficiently bright to account for the loss of a less expensive, less efficient coating. Because the invention allows for far greater efficiency because only the used portion of the eyebox is illuminated at one time, these issues are mitigated. Because the high speed frame sequential display and correction capability is inherent, correction of the lateral color aberrations can also be performed using an otherwise uncorrected HUD projection optical design.

In an embodiment, the pupil scanning imager is part of a HUD system wherein the optical relay projects collimated beams to the pupil via a combiner rendering the projected image to appear at infinity and enabling the superposition of the projected image over natural scene transmitted through the combiner. Therein the combiner is part of the optical imaging system. The combiner is a partially reflective and partially transmissive element made so as to reflect a considerable fraction of the incident light beam projecting the image to the observer's pupils yet to transmit a vast fraction of the transmitted light. In an aspect of this embodiment the combiner possesses dioptric power. In another aspect of this embodiment the combiner comprises planar surfaces and is devoid of dioptric power.

The eye tracker is a standard device used to track pupil location of drivers, pilots and in general personnel whose dynamic eye position is imperative to operating systems such as aircraft, automobiles, trains, military vehicles, to name a few. Some commercial eye trackers operate by emitting and dynamically recording reflected IR radiation from the eye front or back cornea surface. Their bandwidth is typically between 240 and 2000 Hz, well compatible with the pupil scanning imager required bandwidth of about 100 Hz.

DETAILED DESCRIPTION OF DRAWINGS

Referring now to FIG. 1, from an illumination source 110 rays emanate into an optical projector 112 equipped with an SLM 114 that is controlled by a Digital Image Data processor 116. The rays from the projector 112 are directed to an optical relay 118, which has a beam steering capability, by the means of internally moving optical elements. The moving optical elements in relay 118 are controlled by driver-processor 120. The moving optical relay 118 projects rays 122 into a pupil 124. An eye tracker 126 monitors the coordinates of the pupil 124 reporting them to the driver-processor 120.

Figure 2:
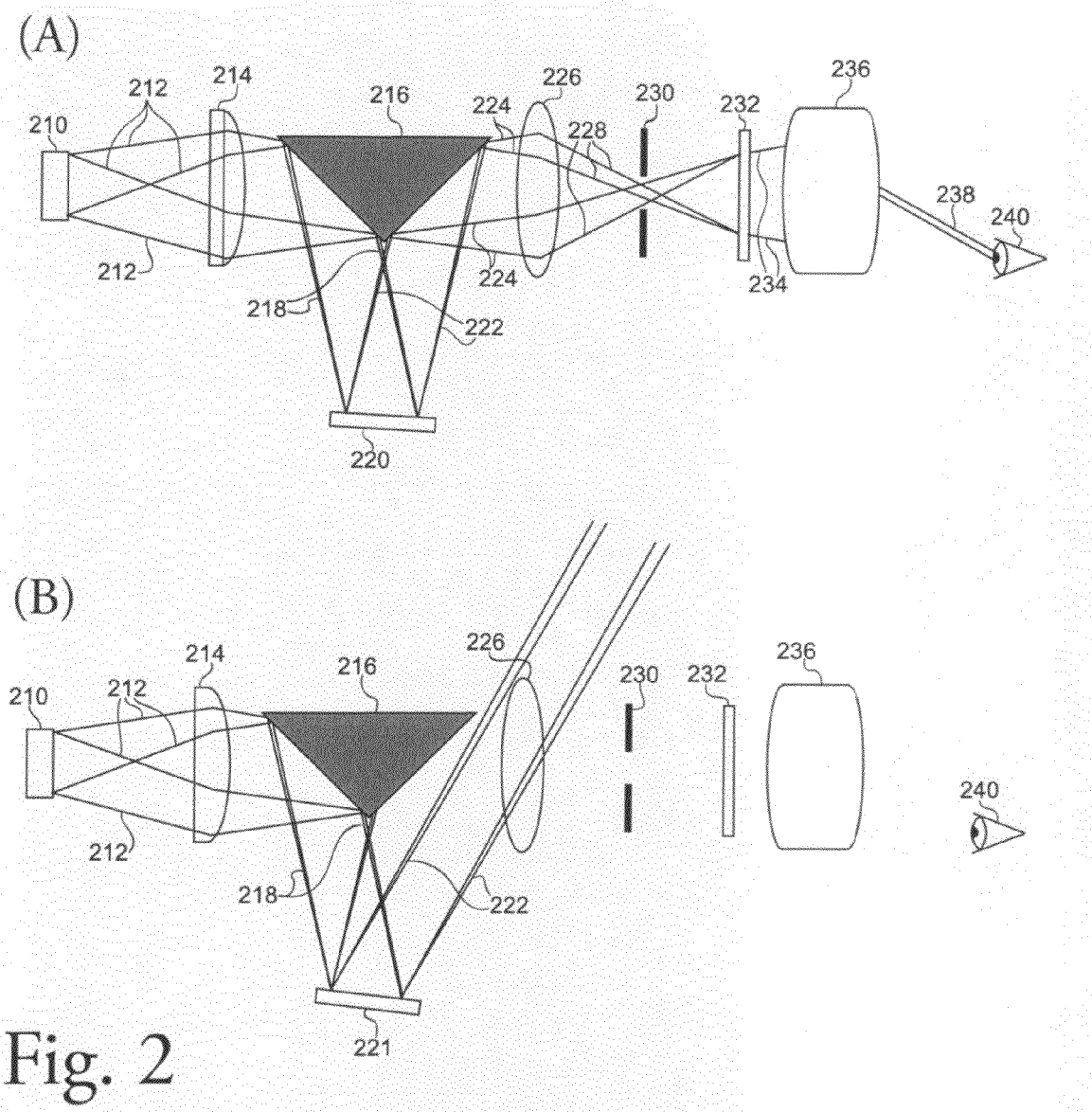
FIG. 2A is an illustration of the pupil scan apparatus of FIG. 1 showing the projection of an image to the pupil with a depiction of an SLM pixel representing a bright segment.
FIG. 2B is an illustration of the pupil scan apparatus of FIG. 1 showing the projection of an image to the pupil with a depiction of an SLM pixel representing a dark segment.

As shown in FIG. 2A, from an illumination source 210 rays 212 emanate into a conditioning optic 214 that forms a spot of light by folded rays 218 reflected by planar mirror 216 on an SLM 220. The mirror 216 is realized in a right-angle triangular cube enabling two orthogonal mirrors. Element 220 represents an individual micro mirror of a controllable SLM realized by DMD set at a state which reflects the light by rays 222 bouncing off a planar mirror 216 to an imaging lens 226. The bent rays 228 propagate through an optical stop 230 forming an image on a diffuser 232. Elements 214, 216, 226, 228, 230 and 232 constitute an optical projector. The rays 234 from the diffuser 232 are directed to an optical relay 236, which has a controllable beam steering capability, by the means of internally moving optical elements. The moving optical relay 236 projects rays 238 into a pupil 240. As shown in FIG. 2B, the individual micro mirror of a controllable SLM realized by DMD is set at another state 221 which reflects the light by rays 222 outside of the path of the optical projector, thus projecting a dark spot to the eye pupil 240.

Figure 3:
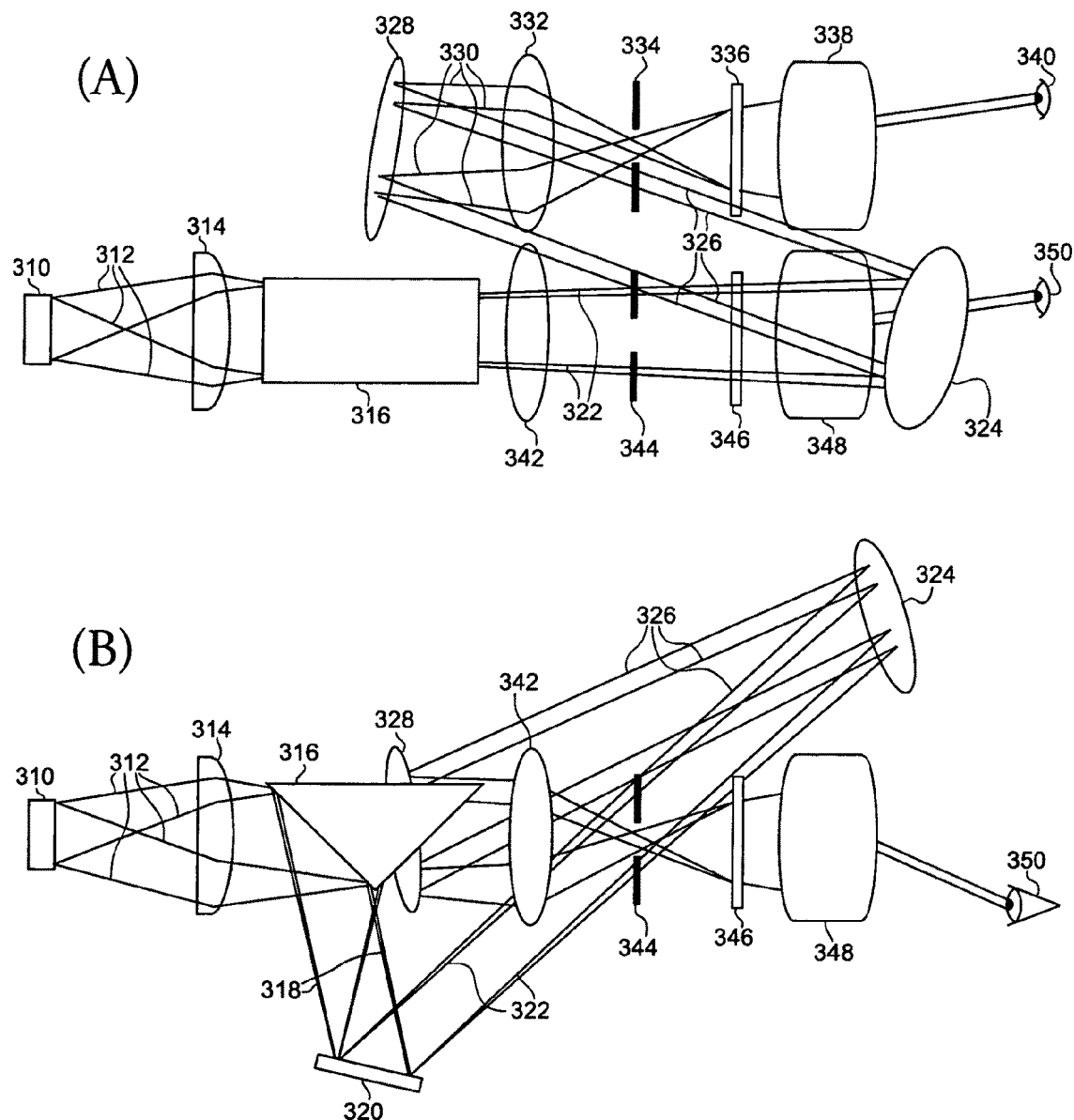
FIG. 3 is an illustration of a biocular pupil scan apparatus in accordance with the inventions.
Figure 4:
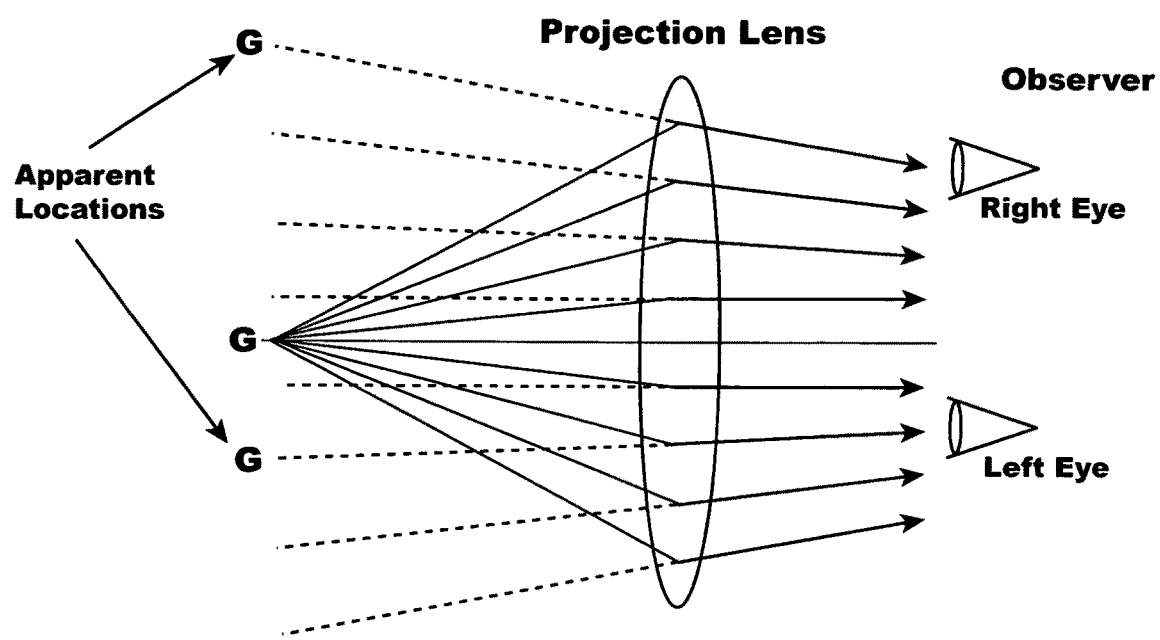
FIG. 4 is a schematic of a binocular optic with parallax showing a top view depicting the observer's point of view where the divergent angle between the left and right eye views would likely result in either a double image or eyestrain.

As depicted in FIG. 3A, a top view of a binocular imaging system is shown. From an illumination source 310 rays 312 emanate into a conditioning optic 314 that forms a spot of light by folded rays 318 reflected by planar mirror 316 on an SLM 320 (see FIG. 3B). The mirror 316 is realized in a right-angle triangular cube enabling two orthogonal mirrors. Element 320 represents an individual micro mirror of a controllable SLM realized by DMD set at a first state intended to project a light spot to the right eye pupil, thus directing the light rays 322 to a planar mirror 324 bouncing off rays 326 directed to a further planar mirror 328 directed as rays 330 to an imaging lens 232. The image rays propagate through an optical stop 334 forming an image on a diffuser 336. An optical relay 338, which has a controllable beam steering capability by the means of internally moving optical elements, projects the image into the right eye pupil 340. Set at a second state intended to project a light spot to the left eye pupil the individual micro mirror of a controllable SLM realized by DMD directs the light rays 322 to a planar mirror 316 bouncing off the rays to an imaging lens 342 propagating thereafter through elements 344, 346 and 348 to the left eye pupil 350. The lower illustration shows a side view of same embodiment of the pupil scanning imager.

Figure 5:
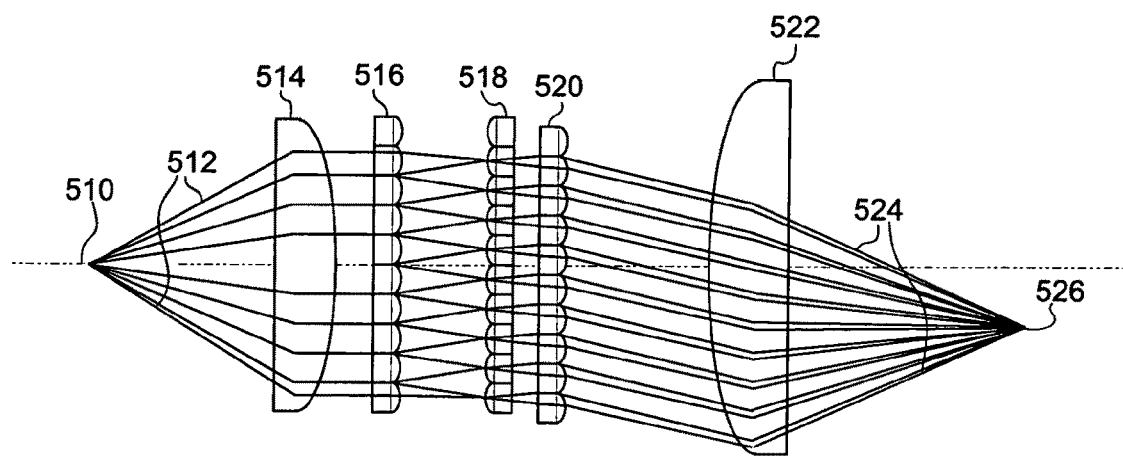
FIG. 5 is a preferred embodiment with a pupil scanning imager comprising a set of three lenslet arrays having identical lenslet arrangement and pitch wherein the first and second arrays are stationary and the third array is mobile in the perpendicular plane, wherein the second array surface is located in the focal plane of the first array and the third array is spaced at a short distance behind it.

Referring now to FIG. 5, the preferred embodiment of the invention is shown. From object point 510 rays 512 propagate to collimating lens 514 then to lenslet array 516 that focuses the incident beamlets. A second lenslet array 518 is placed such that its left facet is located at the focal distance of 516. It contracts the beamlets, which arrive at a third lenslet 520 that collimates and steers the beamlets. Lenslet array 520 is mobile in the plane perpendicular to the optical axis by an X-Y driver, thereby steering the beamlets. An imaging lens 522 converges the beamlets 524 imaging them at point 526.

Figure 6:
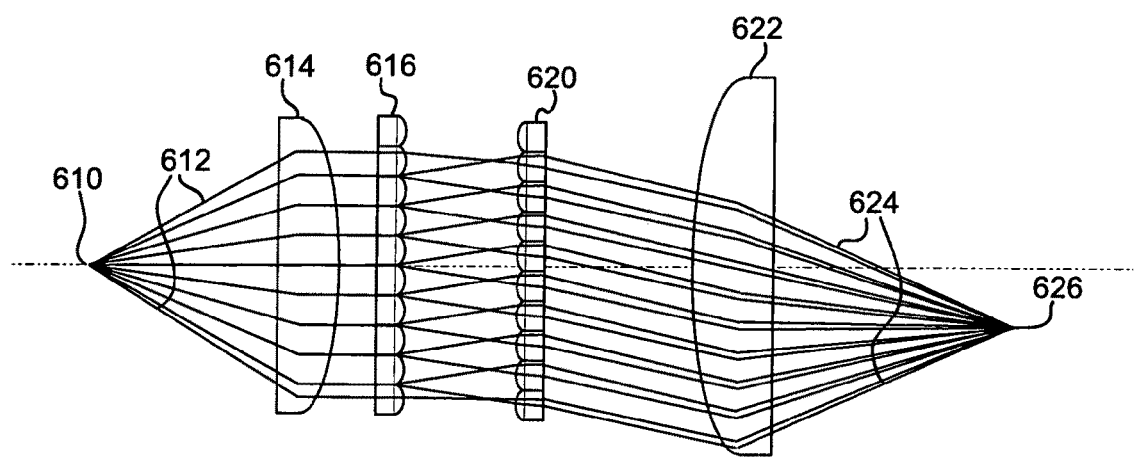
FIG. 6 is another embodiment with a pupil scanning imager comprising a set of two lenslet arrays having identical lenslet arrangement and pitch wherein the numerical aperture of the second array is smaller than that of the first array and wherein the first array is stationary and the second array is mobile in the perpendicular plane, wherein the second array surface is spaced at its focal length from the focal plane of the first array.

As shown in FIG. 6, from object point 610 rays 612 propagate to collimating lens 614 then to lenslet array 616 that focuses the incident beamlets. A second lenslet array 620 collimates and steers the beamlets. Lenslet array 620 is mobile in the plane perpendicular to the optical axis by an X-Y driver, thereby steering the beamlets. An imaging lens 622 converges the beamlets 624 imaging them at point 626.

Figure 7:
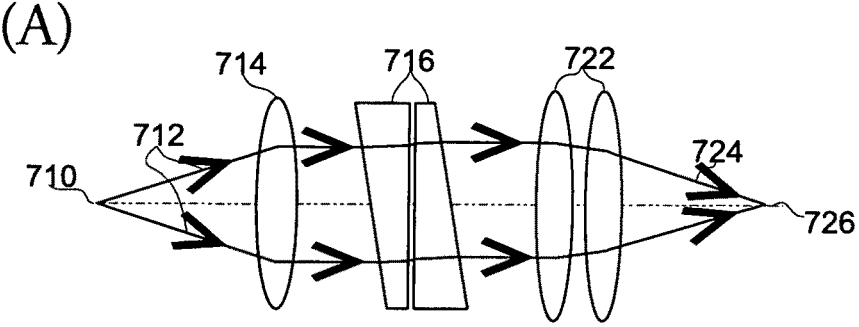
FIG. 7 is yet another embodiment with a pupil scanning imager comprising a Risley prism-pair individually rotateable and spaced very closely from one another. In order to image the object or relay the image to any three-dimensional coordinate these optics must be controllably set at a specific angular position attained by rotary motors that are issued location data commands by a controller being fed pupil coordinates by the pupil tracker: A) a state where the first of the two prisms is rotated about the optical axis by 0°, B) a state where the first of the two prisms is rotated about the optical axis by 90°, and C) a state where the first of the two prisms is rotated about the optical axis by 180°.
Figure 7:
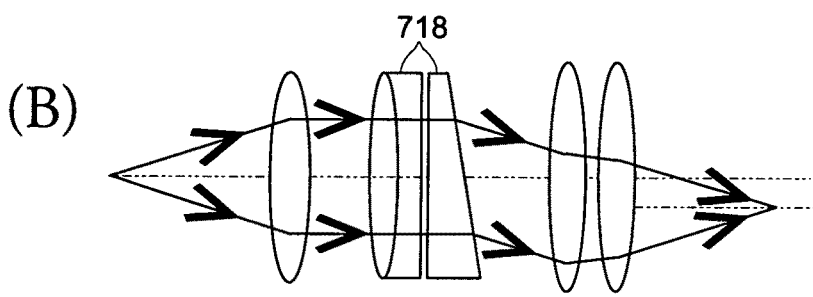
Figure 7:
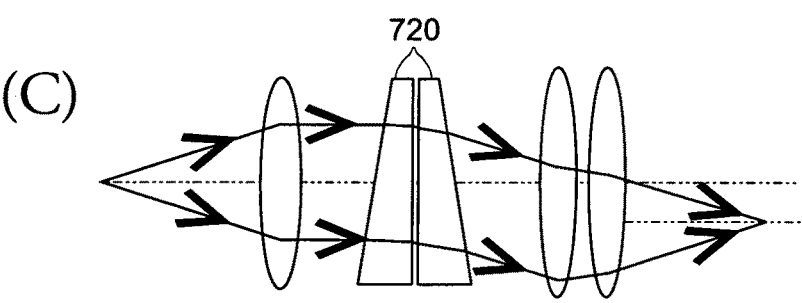

FIG. 7 illustrates an embodiment where from object point 710 rays 712 propagate to collimating lens 714 then to a Risley-prism pair 716. The Risley-prism pair 716 steers the beam of light depending on the rotational position of the prisms in the plane perpendicular to the optical axis. The two prisms are individually controllably rotateable thereby steering the beam. An imaging lens 722 converges the beam 724 imaging at point 726. In the second view the first Risley prism of the pair 716 is rotated by 90° relative to the first view represented by element 718. In the third view the first Risley prism of the pair 716 is rotated by 180° relative to the first view represented by element 720.

Figure 8:
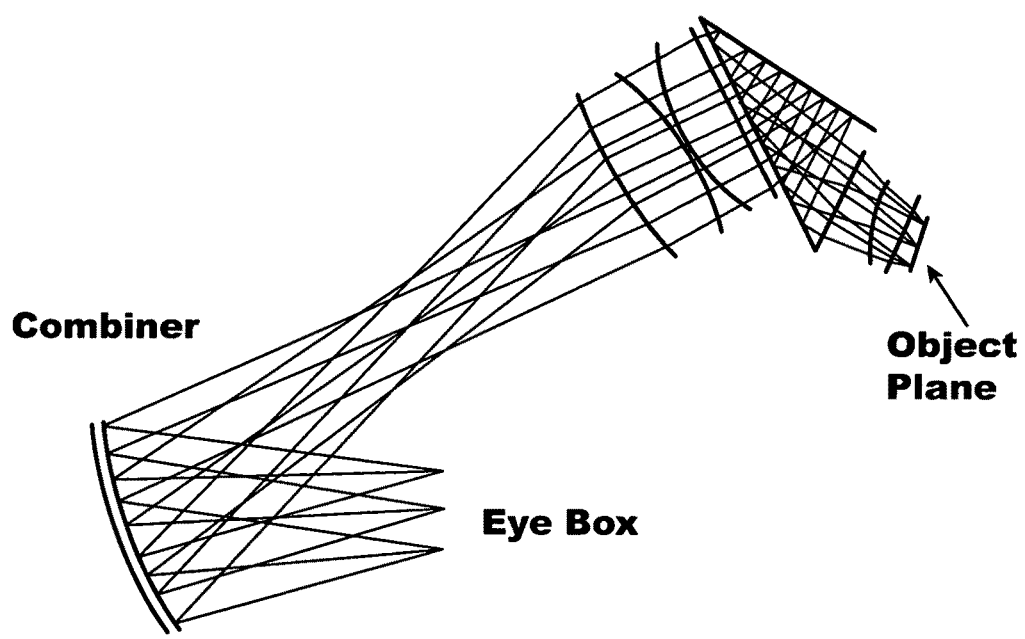
FIG. 8 is a Typical HUD raytrace-layout in side view with the object plane (rightmost line), section view of the projection lenses and prism, and combiner (leftmost element).

FIG. 8 illustrates a side view of a typical HUD raytrace layout with the object plane, section view of the projection lenses and prism, and combiner glass shown filling the eye box.

Color imaging properties of a HUD projection embodiment: left-hand side figure showing variation in parallax over an imaginary EMB as a function of color, and the right-hand side figure showing the lateral chromatic aberration separating the images in each color, about 2 mm span between the red and blue.

Figure 9:
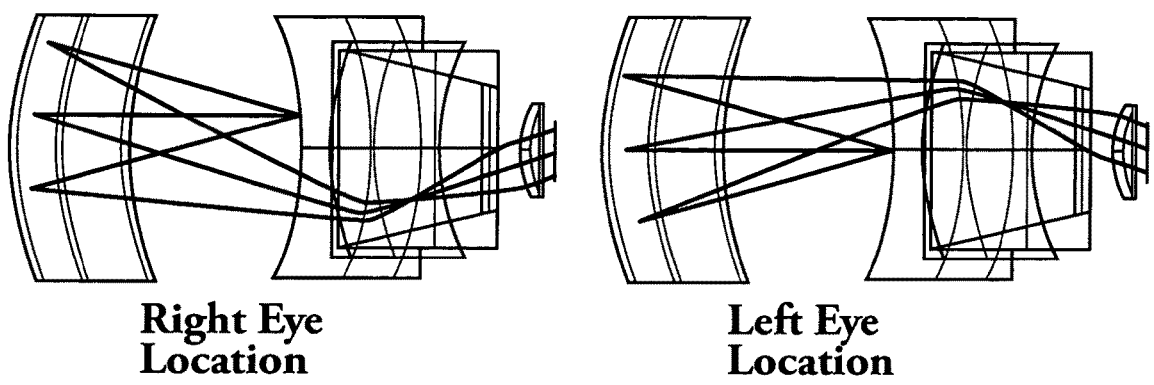
FIG. 9 is a Top view of ray bundles for arbitrary left and right eye pupil locations.

FIG. 9 is a to view illustration of ray bundles for left and right eye pupil locations.

Figure 10:
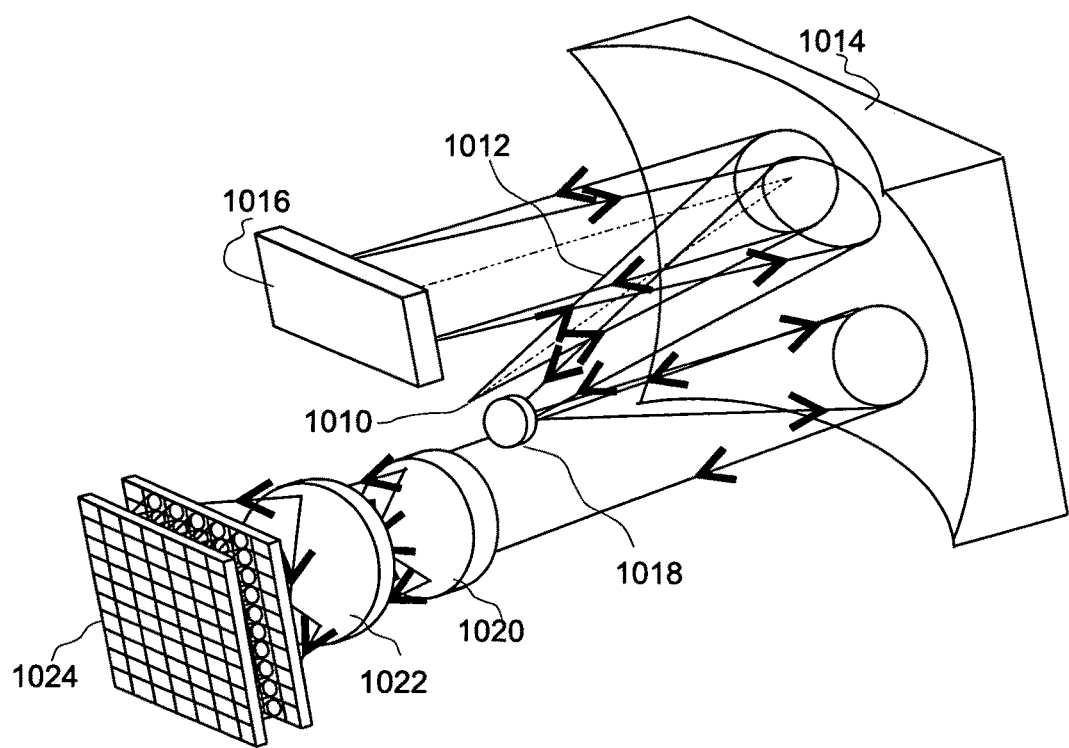
FIG. 10 is a DMD based embodiment with catadioptric, folded reimaging.

As shown in FIG. 10, a catadioptric optical system is illustrated. From an illumination point source 1010, rays 1012 emanate into a concave mirror 1014 having a focus at the point 1010. These rays are reflected toward an SLM realized by a DMD 1016. Mirrors of the DMD, which are set as to project bright pixels, reflect the rays back to the mirror 1014 at a small angle relative to rays incident on the DMD. Reflected off mirror 1016 the rays arrive at a mirror 1018 set near the focus of mirror 1014 and are reflected yet again towards mirror 1014 and from there to the diffuser 1020. The above description is of a catadioptric system in which the DMD 1016 is imaged on the diffuser 1020. Form the diffuser, the rays are directed to an optical relay comprising a lens 1022 and a beam steering set 1024 made of two lenslet arrays of which the second is mobile in the plane perpendicular to the optical axis.

Although the present invention has been described with reference to certain preferred embodiments thereof, other versions are readily apparent to those of ordinary skill in the art of the preferred embodiments contained herein.

What is claimed is:

1. A pupil scan apparatus for projecting the image of an object to a location in space where a viewer's eyes are located in a dynamic fashion to follow the pupils, said apparatus comprising: an eye tracking device; a source of light for illuminating sub-apertures matching the pupils' aperture; conditioning optical elements; a spatial light modulator (SLM); an optical relay; an eyepiece; and a digital image processor; wherein said apparatus has a dynamic bandwidth that is compatible with the viewer's image perception rate.

2. The apparatus of claim 1 wherein said apparatus projects a single image to a single sub-aperture coinciding with the location of one pupil of the viewer.

3. The apparatus of claim 1 wherein said apparatus projects an image pair to a pair of sub-apertures with the location of the viewer's pupils.

4. The apparatus of claim 3 wherein said image pair is biocular stereoscopic with a limited parallax having maximal convergence, divergence, and dipvergence values of 2 mrad, 1.5 mrad, and 1.2 mrad, respectively.

5. The apparatus of claim 1 wherein the illumination source is a light source selected from the group consisting of a polychromatic LED, a monochromatic LED, a laser, and an incandescent light.

6. The apparatus of claim 5 wherein said laser illumination source further comprises a despeckling apparatus to substantially reduce the speckle appearance.

7. The apparatus of claim 1 wherein said SLM is constituted by a deformable mirror device (DMD).

8. The apparatus of claim 7 wherein said DMD is configured to operates as a digital light processor (DLP) reflecting the incident illumination to a number of angular positions that are further utilized to form a set of individual and disparate images serving as independent image pairs.

9. The apparatus of claim 7 wherein said DMD comprises at least three active angular positions and one passive angular position.

10. The apparatus of claim 1 further comprising a retinal scan device such that said apparatus is rendered inoperative if the retinal scan of an operator does not match a retinal scan of an authorized user.

11. The apparatus of claim 1 further comprising: relay optics comprising a mobile adjustable optical unit configured to enable motion of the image in the general space where the viewer's eyes are located.

12. The apparatus of claim 11 wherein said mobile adjustable optical unit further comprises a set of three lenslet arrays and at least one lenslet array is mobile.

13. The apparatus of claim 12 wherein the motion of said mobile adjustable optical unit is provided by a two-dimensional translation stage with a stroke of at least 100 micrometers.

14. The apparatus of claim 1 wherein said apparatus is adapted to cooperate with an aircraft HUD.

15. The apparatus of claim 14 wherein the image obtained is implemented in the pilot's display system.

16. The apparatus of claim 1, wherein the conditioning optical elements are configured to perform at least one of the following functions to a beam of light emitted from the source of light: beam homogenization, beam direction, and beam-spot shaping.

17. The apparatus of claim 1, wherein the digital image processor is configured to control the SLM.

18. The apparatus of claim 1, further comprising a driver-processor configured to control the optical relay.

* * * * *